United States Patent
Han et al.

(10) Patent No.: US 10,025,997 B2
(45) Date of Patent: Jul. 17, 2018

(54) DEVICE AND METHOD FOR RECOGNIZING OBSTACLE AND PARKING SLOT TO SUPPORT UNMANNED AUTONOMOUS PARKING FUNCTION

(71) Applicant: ELECTRONICS AND TELECOMMUNICATIONS RESEARCH INSTITUTE, Daejeon (KR)

(72) Inventors: Seung Jun Han, Daejeon (KR); Kyoung Wook Min, Sejong-si (KR); Sang Heon Park, Daejeon (KR); Kyung Bok Sung, Daejeon (KR); Jeong Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 288 days.

(21) Appl. No.: 15/130,907

(22) Filed: Apr. 15, 2016

(65) Prior Publication Data
US 2016/0307052 A1    Oct. 20, 2016

(30) Foreign Application Priority Data
Apr. 16, 2015   (KR) .................. 10-2015-0054008

(51) Int. Cl.
*G06K 9/00*         (2006.01)
*B62D 15/02*        (2006.01)

(52) U.S. Cl.
CPC ..... *G06K 9/00798* (2013.01); *B62D 15/0285* (2013.01); *G06K 9/00805* (2013.01)

(58) Field of Classification Search
CPC ........... G06K 9/00798; G06K 9/00805; B62D 15/0285
See application file for complete search history.

(56) References Cited

U.S. PATENT DOCUMENTS

| | | | |
|---|---|---|---|
| 9,076,047 B2 | 7/2015 | Choi et al. | |
| 2009/0010507 A1* | 1/2009 | Geng ..................... | G06T 7/593 382/128 |

(Continued)

FOREIGN PATENT DOCUMENTS

| | | |
|---|---|---|
| KR | 10-2012-0086576 A | 8/2012 |
| KR | 10-2013-0114944 A | 10/2013 |

(Continued)

OTHER PUBLICATIONS

Seung-Jun Han et al., "Effective Height-Grid Map Building using Inverse Perspective Image", IEEE Intelligent Vehicles Symposium, pp. 549-554, Jun. 28, 2015.

(Continued)

*Primary Examiner* — Joseph Suh
(74) *Attorney, Agent, or Firm* — Rabin & Berdo, P.C.

(57) ABSTRACT

Provided herein is a device and a method for recognizing an obstacle and a parking slot to support an unmanned autonomous parking function. The device includes a motion measurement unit measuring a vehicle motion using an in-vehicle sensor, an inverse perspective transform unit performing inverse perspective transformation of an image, which is obtained using a wide-angle camera, to obtain an inverse perspective image, and an obstacle detection unit detecting the obstacle using the inverse perspective image.

9 Claims, 15 Drawing Sheets

(56) References Cited

U.S. PATENT DOCUMENTS

| | | | |
|---|---|---|---|
| 2009/0243889 A1* | 10/2009 | Suhr | G06K 9/00812 |
| | | | 340/932.2 |
| 2010/0156672 A1 | 6/2010 | Yoo et al. | |
| 2013/0265429 A1 | 10/2013 | Yoon et al. | |
| 2014/0236412 A1 | 8/2014 | Sung et al. | |
| 2014/0324310 A1 | 10/2014 | Kobayashi et al. | |
| 2016/0039409 A1* | 2/2016 | Hayakawa | B60W 30/06 |
| | | | 701/70 |
| 2016/0232705 A1* | 8/2016 | Ramalingam | G06T 7/593 |

FOREIGN PATENT DOCUMENTS

| KR | 10-2014-0052383 A | 5/2014 |
|---|---|---|
| KR | 10-2014-0143558 A | 12/2014 |

OTHER PUBLICATIONS

Seung-Jun Han et al., "Parking Space Recognition for Autonomous Valet Parking Using Height and Salient-Line Probability Maps", ETRI Journal, vol. 37, No. 6, pp. 1220-1230, Dec. 1, 2015.

\* cited by examiner

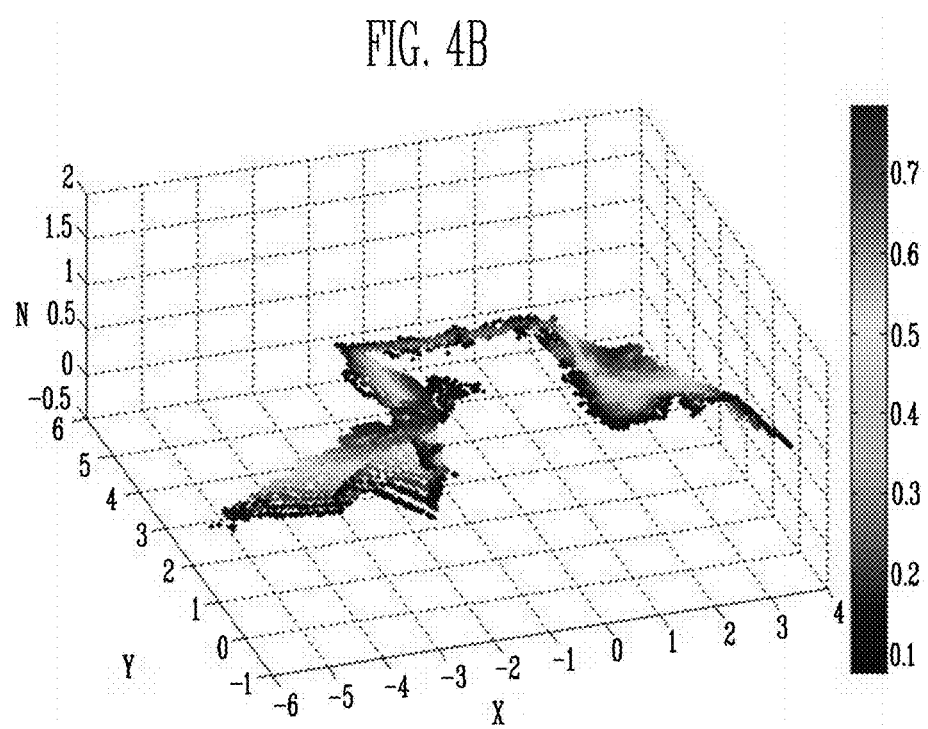

|  |  | d [m] | A/B [m] |
|---|---|---|---|
| Non-Parallel | Ordinary | ≥2.3 | ≥5.0 |
|  | Disabled | ≥3.3 | ≥5.0 |
| Parallel |  | ≥6.0 | ≥2.0 |

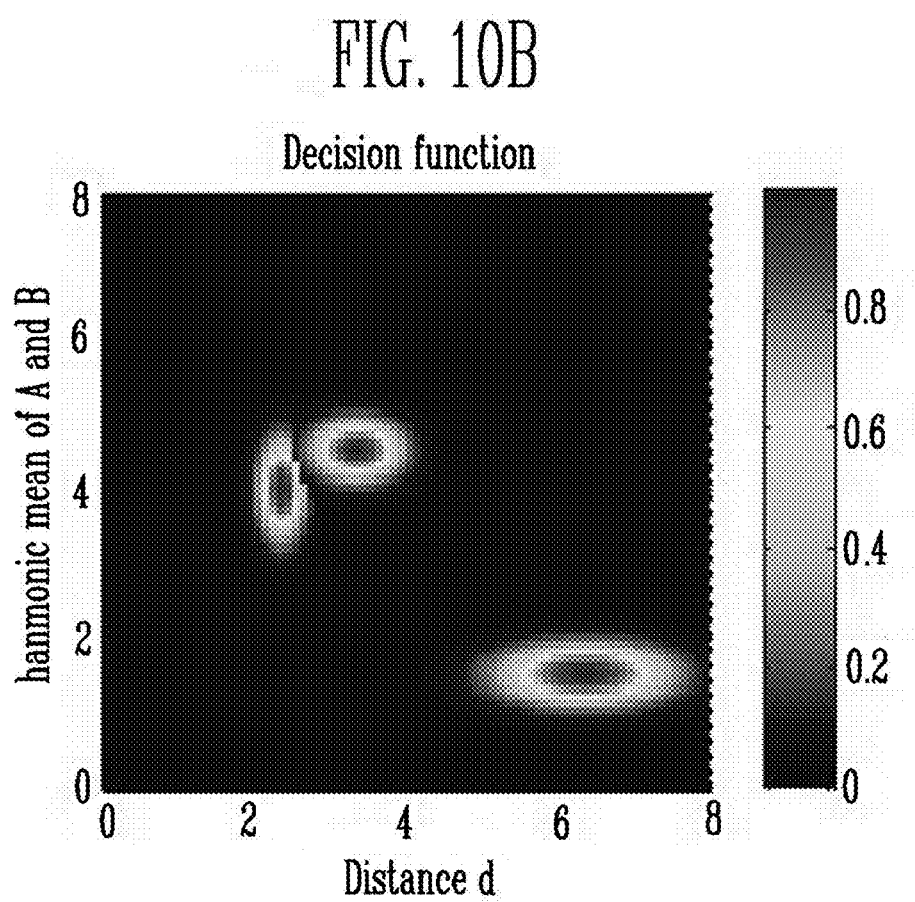

DEVICE AND METHOD FOR RECOGNIZING OBSTACLE AND PARKING SLOT TO SUPPORT UNMANNED AUTONOMOUS PARKING FUNCTION

CROSS-REFERENCE TO RELATED APPLICATION

The present application claims priority to Korean patent application number 10-2015-0054008 filed on Apr. 16, 2015 the entire disclosure of which is incorporated herein in its entirety by reference.

BACKGROUND

Field of Invention

Various embodiments of the present disclosure relate to a device and a method for recognizing a parking slot and an obstacle around a vehicle, and more particularly, to a device and a method for recognizing a parking slot and a type of parking slot using a camera used to perform a parking function of a parking assistance system or an unmanned autonomous vehicle, and deciding whether the vehicle is capable of being parked in the parking slot.

Description of Related Art

Two technologies are basically required in order to recognize parking spaces. The technologies include recognition of spaces and parking slots. Therefore, the relevant technology may be classified into a space recognition method and a parking slot marking recognition method.

For the space recognition method, a space, in which a vehicle is capable of being parked, is hunted, and the space recognition method is used in currently commercialized most parking assistance system (PAS) products. The space recognition method may be classified according to the sensor used to recognize the space, and an ultra sonic sensor is most frequently used as the sensor. In addition, a range sensor, such as a light detection and raging (LiDAR) sensor and a radar sensor, may be used. Recently, a space recognition technology using a vision has been actively used. For the space recognition technology using the vision, a stereo vision technology using two cameras was used at the beginning, and recently a motion stereo vision technology using a mono camera has been used. The motion stereo vision technology may be classified into a feature-based sparse reconstruction technology and a dense reconstruction technology, and the dense reconstruction technology is known to have excellent performance.

For the parking slot marking recognition method, parking slot lines are recognized using a vision technology. The image obtained using a wide angle camera is mostly subjected to inverse perspective transformation to use. The parking slot includes some straight lines, examples of a method of hunting lines include a method of using Houph transformation and a method of using radon transformation, which are methods using transformation, and a method of hunting a straight-line model optimum parameter and a method of using features of the corner of lines have been studied.

The aforementioned known research is applied to a parking assistance system of a vehicle, on which a driver boards, and focuses on recognition of parking slots and decision whether the parking slot is vacant. Therefore, the aforementioned known research does not provide a method of deciding the type of parking or whether there is a restriction on parking with regard to parking reserved for the disabled. However, the unmanned vehicle, which decides things for itself, positively requires the aforementioned information. Further, the known research has a drawback in that parking slots, which seldom have traffic lanes and are adjacent to the curb, the flowerbed, or the pedestrian area, are not recognized.

SUMMARY

Various embodiments of the present disclosure are directed to a device and a method for recognizing an obstacle and a parking slot to support an unmanned autonomous parking function, such that the parking slot is detected and a type of parking slot and the obstacle are recognized using only image information.

One embodiment of the present disclosure provides a device for recognizing an obstacle and a parking slot to support an unmanned autonomous parking function, the device including a motion measurement unit measuring a vehicle motion using an in-vehicle sensor, an inverse perspective transform unit performing inverse perspective transformation of an image, which is obtained using a wide-angle camera, to obtain an inverse perspective image, and an obstacle detection unit detecting the obstacle using the inverse perspective image.

Furthermore, the device may further include a line marking detection unit detecting a parking slot marking line using the inverse perspective image.

Furthermore, the device may further include a map building unit may build a line marking map using information transferred from an obstacle detection unit and the line marking detection unit.

Furthermore, the device may further include a parking space recognition unit recognizing a parking space using the line marking map built using the map building unit.

Furthermore, the in-vehicle sensor may include at least one of a wheel speed sensor, a yaw rate sensor, and a steering angle sensor.

Another embodiment of the present disclosure provides a method of recognizing an obstacle and a parking slot to support an unmanned autonomous parking function, the method including: measuring a vehicle motion using an in-vehicle sensor; performing inverse perspective transformation of an image obtained by a wide-angle camera, and obtaining an inverse perspective image; detecting the obstacle using the inverse perspective image; and detecting a parking slot marking line using the inverse perspective image.

Furthermore, the method may further include building a line marking map using detected obstacle information and parking slot marking line information.

Furthermore, the method may further include recognizing a parking space using the line marking map.

Furthermore, the in-vehicle sensor may include at least one of a wheel speed sensor, a yaw rate sensor, and a steering angle sensor.

Furthermore, the detecting of the obstacle using the inverse perspective image may include obtaining an image before and after the vehicle motion and performing stereo rectification of the image using a SFM (structure from motion) technology; performing dense reconstruction from the rectified image; and projecting the image that is subjected to the dense reconstruction, on a grid map, and segmenting the image according to a height and detecting the obstacle.

The present disclosure provides a device and a method for recognizing an obstacle and a parking slot to support an unmanned autonomous parking function, such that the parking slot is recognized, the obstacle is detected, and a type of parking slot, which is required to perform autonomous parking of unmanned vehicles, is recognized.

The present disclosure also provides a device and a method for recognizing an obstacle and a parking slot to support an unmanned autonomous parking function, such that the obstacle, the parking slot, and a type of parking slot around vehicles are recognized using only a vehicle sensor and an image sensor provided in known vehicles.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 4A, 4B, and 4C are views showing a method of detecting an obstacle according to the embodiment of the present disclosure;

FIGS. 10A and 10B are views showing a method of recognizing a parking space according to the embodiment of the present disclosure.

DETAILED DESCRIPTION

Figure 1:
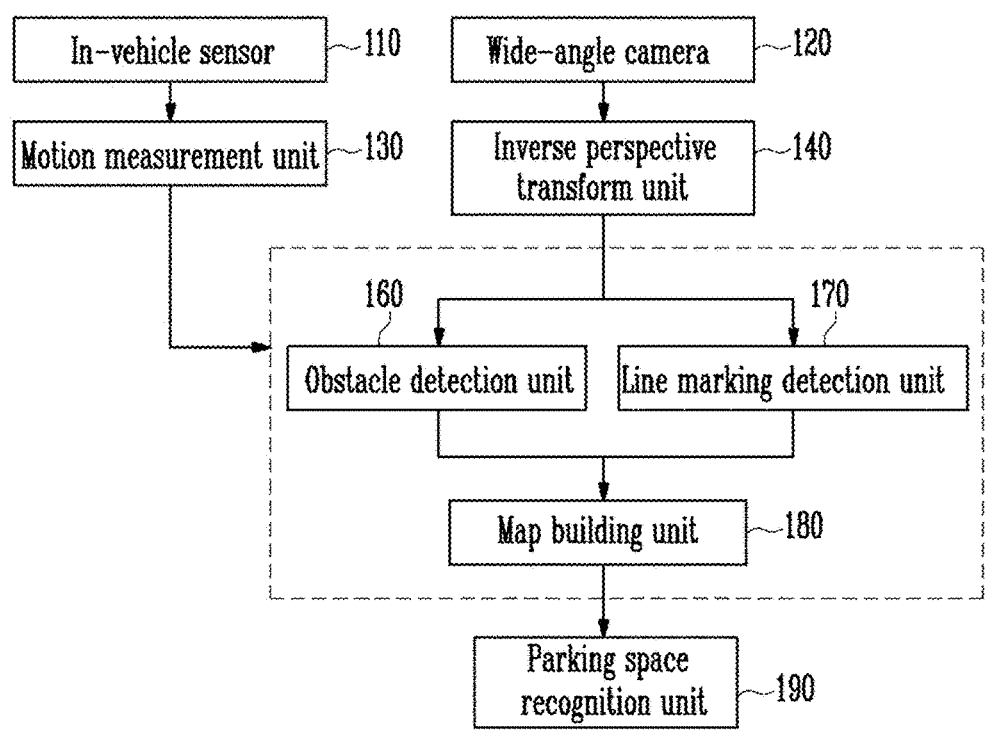
FIG. 1 is a view showing a device for recognizing an obstacle and a parking slot to support an unmanned autonomous parking function according to an embodiment of the present disclosure.

Specific matters of embodiments are included in the detailed description and the drawings.

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Hereinafter, a device and a method for recognizing an obstacle and a parking slot to support an unmanned autonomous parking function according to an embodiment of the present disclosure will be described with reference to embodiments of the present disclosure and the drawings illustrating the embodiments.

It is an object of the present disclosure to apply the device and the method to a parking function of a parking assistance system and an unmanned vehicle. Particularly, the aforementioned space and parking slot recognition technologies need to be combined in order to perform unmanned parking of the unmanned vehicle. In addition, for the recognized parking space, there is a need to decide the type of parking among right-angled parking and parallel parking, and also decide whether there is a legal restriction on parking with regard to parking reserved for the disabled.

The present disclosure provides a method of detecting a parking slot and recognizing a type of parking slot and an obstacle using only image information.

In more detail, the present disclosure provides a method of obtaining an inverse perspective image (IPI) of the bottom side of the road, from which perspective distortion is removed, from image sensor information, and detecting tall and low obstacles on the road surface using the inverse perspective image (IPI), a method of removing noise from traffic lane information, which is detected using the inverse perspective image (IPI), using a map building technology, and reconstructing traffic lane information between vehicles, and a method of finally recognizing the parking slots and the type of parking slots using the aforementioned informations.

The method of the present disclosure is characterized in that obstacle information and parking slot information are combined to precisely recognize the parking slots having insufficient lines. Further, the known motion stereo technology has a drawback in that depth information is obtained from the input image and accordingly the coordinate system of depth information should be transformed. However, the method of the present disclosure has a merit in that motion stereo is directly performed using the inverse perspective image to obtain depth information having a high resolution without any coordinate transformation.

FIG. 1 is a view showing a device for recognizing an obstacle and a parking slot to support an unmanned autonomous parking function according to an embodiment of the present disclosure.

Referring to FIG. 1, the device for recognizing the obstacle and the parking slot to support the unmanned autonomous parking function according to the embodiment of the present disclosure may include an in-vehicle sensor 110, a wide-angle camera 120, a motion measurement unit (vehicle ego-motion measurement unit) 130, an inverse perspective transform unit 140, an obstacle detection unit 160, a line marking detection unit 170, a map building unit 180, and a parking space recognition unit 190.

The in-vehicle sensor 110 is a sensor positioned in the vehicle, and a known sensor, which is basically provided in the vehicle, may be used.

For example, the in-vehicle sensor 110 may include at least one of a wheel speed sensor, a yaw rate sensor, and a steering angle sensor.

The motion measurement unit 130 may measure a vehicle motion (vehicle ego-motion) using the in-vehicle sensor 110.

For example, the motion measurement unit 130 may measure the vehicle motion using data measured using the in-vehicle sensor 110.

The vehicle motion, which is measured using the motion measurement unit 130, may be used as auxiliary data to process image information.

The wide-angle camera 120 may be positioned outside the vehicle, and one or more wide-angle cameras 120 may be provided to the vehicle.

For example, a plurality of wide-angle cameras 120, which photograph the front, rear, left, and right sides of the vehicle, may be provided.

The inverse perspective transform unit 140 may perform inverse perspective transformation (IPT) of the image, which is obtained using the wide-angle camera 120, to obtain the inverse perspective image (IPI).

The inverse perspective image(IPI), which is obtained using the inverse perspective transform unit 140, may be used to detect the obstacle and the parking slot marking on the road surface.

The obstacle detection unit 160 may detect the obstacle around the vehicle using the inverse perspective image (IPI) obtained using the inverse perspective transform unit 140.

The line marking detection unit 170 may detect the parking slot marking lines around the vehicle using the inverse perspective image (IPI) obtained using the inverse perspective transform unit 140.

The map building unit 180 may build a line marking map using information transferred from the obstacle detection unit 160 and the line marking detection unit 170.

For example, the map building unit 180 may build a digital map using obstacle information, which is detected using the obstacle detection unit 160, and parking slot marking line information, which is detected using the line marking detection unit 170.

The parking space recognition unit 190 may recognize the parking space using the line marking map built by the map building unit 180.

For example, the parking space recognition unit 190 may recognize whether the parking space is present or not using formation information of the line marking map built by the map building unit 180.

Hereinafter, a method of setting a coordinate system and measuring the vehicle motion will be described. The motion measurement unit 130 may measure the vehicle motion using the following method.

1. Coordinate System

Figure 2:
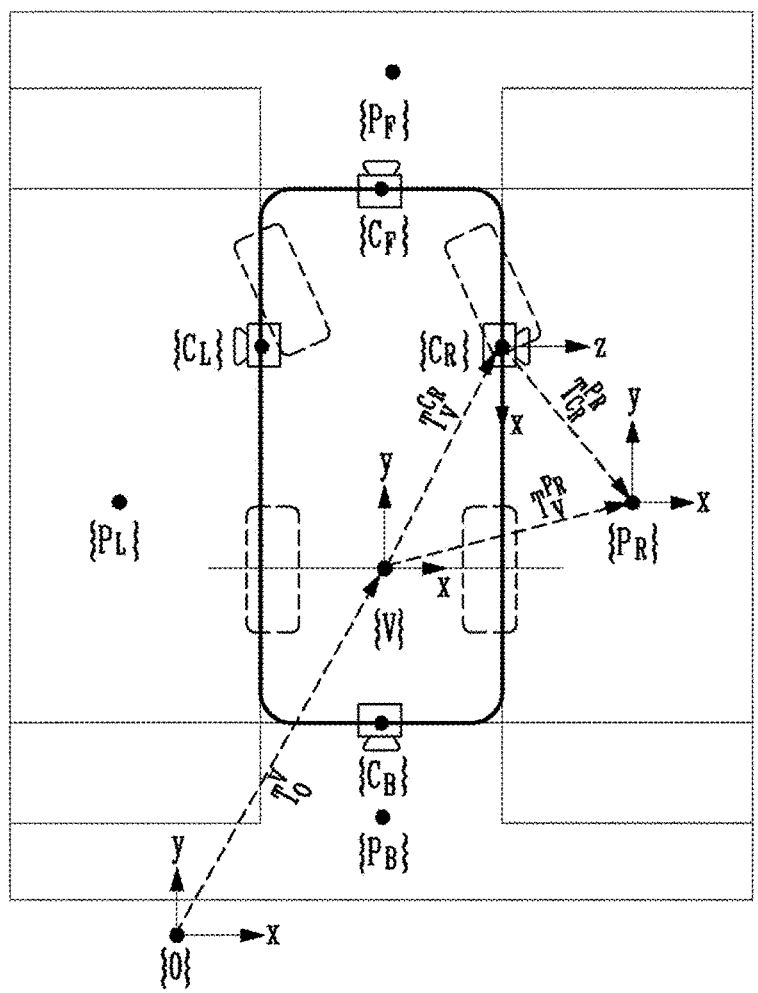
FIG. 2 is a view showing a coordinate system used in the present disclosure.

FIG. 2 is a view showing the coordinate system used in the present disclosure.

Each frame is represented by $\{\cdot\}$, and the origin spot is represented by the black spot. $\{O\}$ is an origin frame, and posture of the vehicle when the time t is 0.

$\{V\}$ is a vehicle frame and posture of the vehicle at the current time, and is positioned at the center of the shaft of the rear wheel which is the rotation shaft.

$\{C\}$ is a camera frame and posture of the camera based on $\{V\}$, and $\{C_L\}$, $\{C_R\}$, $\{C_F\}$, and $\{C_B\}$ are left, right, front, and rear camera frames respectively.

$\{P\}$ is a projective plane frame and the road surface, which is faced by the camera, based on $\{V\}$, and $\{P_L\}$, $\{P_R\}$, $\{P_F\}$, and $\{P_E\}$ are left, right, front, and rear frames respectively.

The vehicle drives on the road. Accordingly, assuming that the vehicle motion is a planar motion, the transformation relationship between the frames is as follows.

$T_O^V \in SO(2)$ is (2) is transformation ranging from $\{O\}$ to $\{V\}$, $T_V^P \in SO(2)$ is transformation ranging from $\{V\}$ to $\{P\}$, and $T_V^C \in SO(3)$ is transformation ranging from $\{V\}$ to $\{C\}$, and all are obtained using extrinsic calibration. $T_C^P \in SO(3)$ is transformation ranging from $\{C\}$ to $\{P\}$. $SO(\cdot)$ is a Lie group.

2. Vehicle Motion

The vehicle motion for a predetermined time t, that is, posture X(t) of the vehicle, is accumulation of the vehicle motion (ego-motion) V(t) and shown in the following integral equation.

$$X(t) = \int_0^t V(t) dt \quad (1)$$

Assuming that the vehicle motion consists of only planar motion, posture of the vehicle is a function of disparity $x_k, y_k$ and the rotation angle $\theta_k$ of the vehicle, and the vehicle motion (ego-motion) is a function of the linear velocity $v_k$ and the angular velocity $\omega_k$ of the vehicle. Various methods, which are capable of obtaining the vehicle motion (ego-motion), are well known, and examples of the methods include a method of using an image sensor, a method of using an inertial sensor, and a method of using a vehicle sensor. For the vehicle sensor, an additional sensor does not need to be provided, and the very precise result is secured even using few calculation when the vehicle moves at a low speed as in the present disclosure, and accordingly, it is preferable to obtain the vehicle motion (ego-motion) using the vehicle sensor.

Hereinafter, a method of obtaining the inverse perspective image (IPI) of the vehicle reference coordinate $\{V\}$ will be described. The inverse perspective transform unit 140 may secure the inverse perspective image (IPI) using the following method.

1. Inverse Perspective Transformation

Figure 3A:
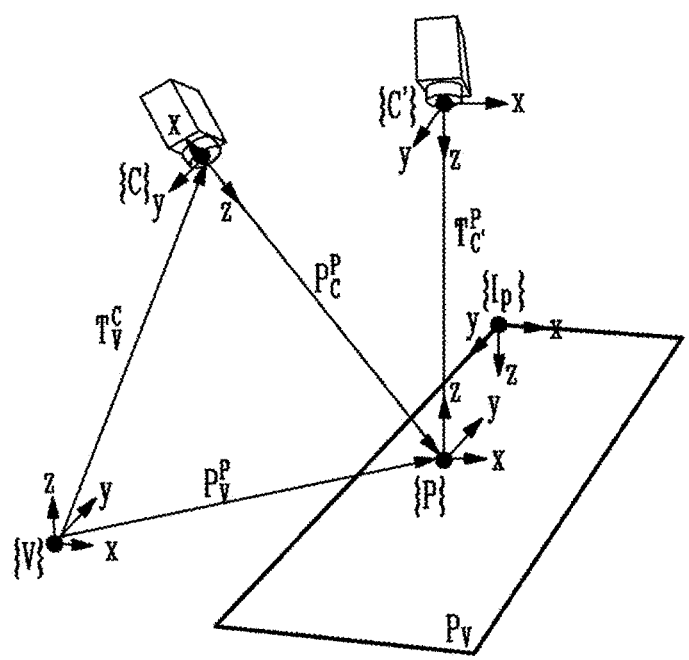
FIGS. 3A and 3B are views showing inverse perspective transformation according to the embodiment of the present disclosure.
Figure 3B:
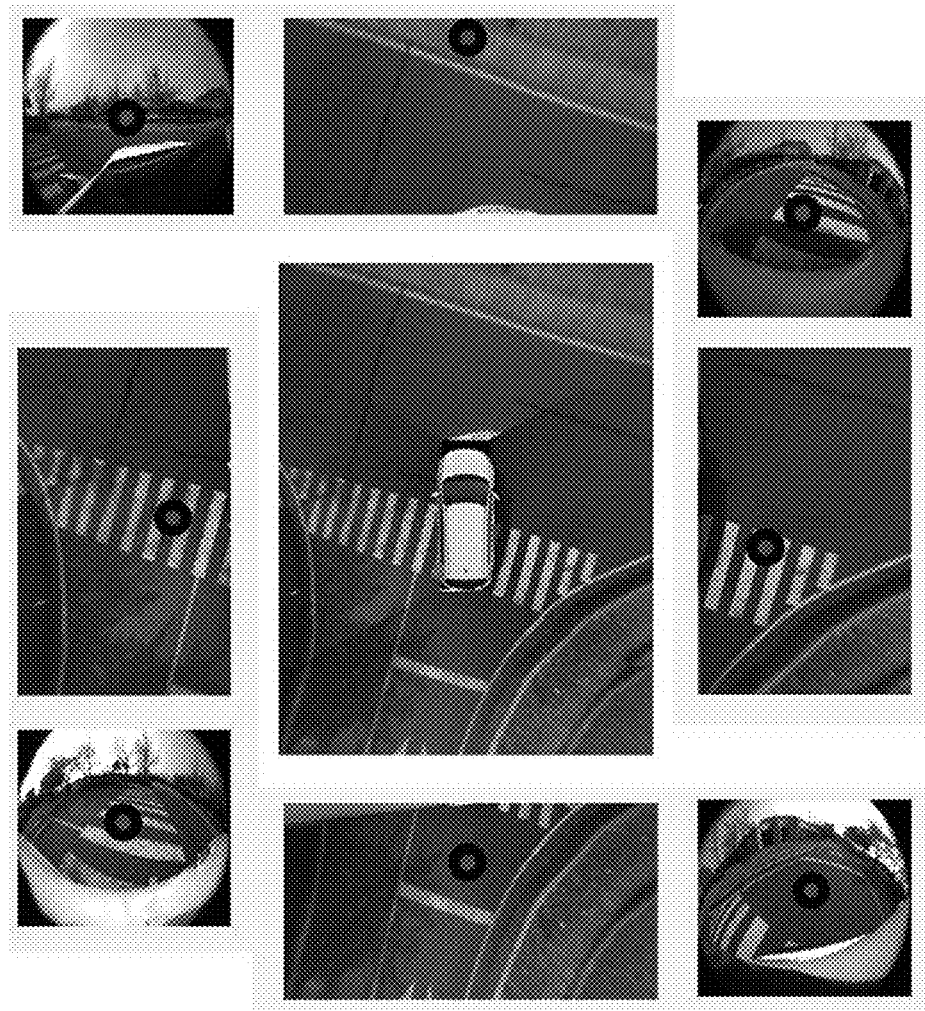

FIGS. 3A and 3B are views showing inverse perspective transformation according to the embodiment of the present disclosure.

Particularly, FIG. 3A is a view showing a frame definition of inverse perspective transformation (IPT), and the projective plane (blue quadrilateral) may be directly mapped to the image in order to correct the perspective distortion. The image may be called an inverse perspective image (IPI).

Further, FIG. 3B is an example of inverse perspective transformation (IPT), which is a surround monitoring system of an autonomous vehicle. The red spots are the optical center.

Inverse perspective transformation (IPT) or inverse perspective mapping (IPM) is transformation of the image into a virtual projective plane in order to remove the perspective effect.

The present disclosure provides the rectified image of the vector set $P_V \in \mathbb{R}^{3 \times 1}$ of the projective planes (blue rectangle) on the road surface as in FIG. 3A.

That is, the camera frame $\{C\}$ is moved in a direction that is perpendicular to the road surface like $\{C'\}$. As described above, $\{P\}$ is present on the same plane as $\{V\}$. Therefore, $P_V$ may be represented by the region of $\{V\}$ $\{x | x_1 \leq x \leq x_r, y | y_b \leq y \leq y_t, z = 0\}$, and may be easily transformed into frame $\{C\}$ using the transformation relationship between the frames.

When the projective coordinate set is $H_{ip} \in \mathbb{R}^{3\times 1}$, the following relationship is valid.

$$H_{ip} = \mathcal{F}_{w}^{i}(T_C^V P_V) \tag{2}$$

$\mathcal{F}_{w}^{i}(\bullet)$ is a nonlinear function used to convert the world coordinate of the camera into the image coordinate, and is obtained using intrinsic calibration of the camera.

$T_C^V$ is a transformation matrix of $\{C\}$ into $\{V\}$, and there is an inverse transformation relationship that $T_C^V = T_V^{C-1}$. $T_V^C$ may be obtained using extrinsic calibration. The finally transformed image $I_P$ is interpolation of the projective coordinate of the input image $I_1$, and shown in the following equation.

$$I_P = \mathcal{F}_{intp}(H_{ip}, I_I) \tag{3}$$

$\mathcal{F}_{intp}(\bullet)$ is an interpolation function. The size of the transformed image depends on $I_P \in N^{n\times m}$. $n=(y_t-y_b)/\delta x$, $m=(x_r-x_1)/\delta x$, and $\delta x$ is a physical size for each pixel.

Further, the origin point $I_P(0,0)$ is the point of $[x_l, y_t 0]_V^T$ in $\{V\}$, and the end point $I_P(n-1, m-1)$ is the point of $[x_r, y_b 0]_V^T$ in $\{V\}$. That is, the coordinate $p_V^I \in \mathbb{R}^{3\times 1}$ of the image coordinate u,v based on $\{V\}$ has the relationship of the following equation (4).

$$p_v = \begin{bmatrix} \delta x & 0 & x_l \\ 0 & \delta x & y_t \\ 0 & 0 & 1 \end{bmatrix} p_i \tag{4}$$

$p_i = [u \ v \ 1]^T \in \mathbb{R}^{3\times 1}$, and accordingly, the image, which is directly mapped between the frame $\{V\}$ and the frame $\{I_p\}$, may be obtained. The image is called an inverse perspective image (IPI).

2. Camera Parameters of Inverse Perspective Image

Camera parameters are required in order to perform geometric analysis from the image. A method of obtaining camera parameters of the aforementioned inverse perspective image (IPI) will be described below. The camera matrix K of the rectified image is shown in the following equation.

$$K = \begin{bmatrix} f & 0 & c_x \\ 0 & f & c_y \\ 0 & 0 & 1 \end{bmatrix} \tag{5}$$

f is the focal distance of the camera and $c_x, c_y$ are the optical center points. In FIG. 3A, the physical meaning of each parameter is as follows. f is the optical distance between the origin point of $\{C\}$ and the origin point of $\{P\}$, and $c_x, c_y$ are the image coordinate in which the origin point of $\{P\}$ is projected on the inverse perspective image (IPI). In order to obtain the parameters, when the vector of $\{P\}$ to the origin point based on $\{V\}$ is defined by $p_V^P \in \mathbb{R}^{3\times 1}$ and the vector of vector of $\{P\}$ to the origin point based on $\{C\}$ is defined by $p_C^P \in \mathbb{R}^{3\times 1}$, the following relationship is valid.

$$p_V^P = T_V^C p_C^P \tag{6}$$

$T_V^C$ is transformation ranging from $\{V\}$ to $\{C\}$, and obtained using extrinsic camera calibration. $p_V^P$ present on the same plane as $\{V\}$, and accordingly, $p_V^P = [X \ Y \ 0]^T$. $p_C^P$ is the distance vector from the optical center point of the camera to the projective plane, and may be represented by the equation $p_C^P = [0 \ 0 \ \bar{Z}]^T$.

Therefore, the equation (6) may be rewritten for each element using the following equation.

$$\begin{bmatrix} X \\ Y \\ 0 \end{bmatrix} = \begin{bmatrix} \alpha & \beta & \gamma & \delta \\ \varepsilon & \epsilon & \theta & \vartheta \\ \mu & \rho & \tau & \varphi \end{bmatrix} \begin{bmatrix} 0 \\ 0 \\ \bar{Z} \\ 1 \end{bmatrix} \tag{7}$$

Undetermined coefficients X, Y and Z of each vector may be calculated using the following equation.

$$\bar{Z} = \frac{-\varphi}{\tau}, \ X = \gamma\bar{Z} + \delta, \ Y = \theta\bar{Z} + \vartheta \tag{8}$$

Finally, the parameters of the camera matrix are calculated using the following equations based on the physical definitions.

$$f = \frac{\bar{Z}}{\delta x}, \ c_x = \frac{x_l - X}{\delta x}, \ c_y = \frac{y_t - Y}{\delta x} \tag{9}$$

$\delta x$ is the physical size for each pixel.

Hereinafter, a method of detecting the obstacle will be described. The obstacle detection unit 160 may detect the obstacles around the vehicle using the method.

Specifically, a method of detecting an obstacle using an inverse perspective image (IPI) and a dense motion-stereo vision technology will be described. Since the coordinate of the inverse perspective image (IPI) is directly transformed into the coordinate of the actual projective plane, the degree of dense motion-stereo distance precision based on the inverse perspective image (IPI) is even higher compared to the case that the perspective camera is used.

The method of detecting the obstacle according to the present disclosure includes the following steps.

The image is obtained before and after the vehicle motion, and stereo rectification of the image is performed using a structure from motion (SFM) technology.

In addition, dense reconstruction is performed using the rectified image. The image, which is subjected to dense reconstruction, is projected on the 2D grid map, and finally segmentation is performed according to the height to detect the obstacle.

Figure 4A:
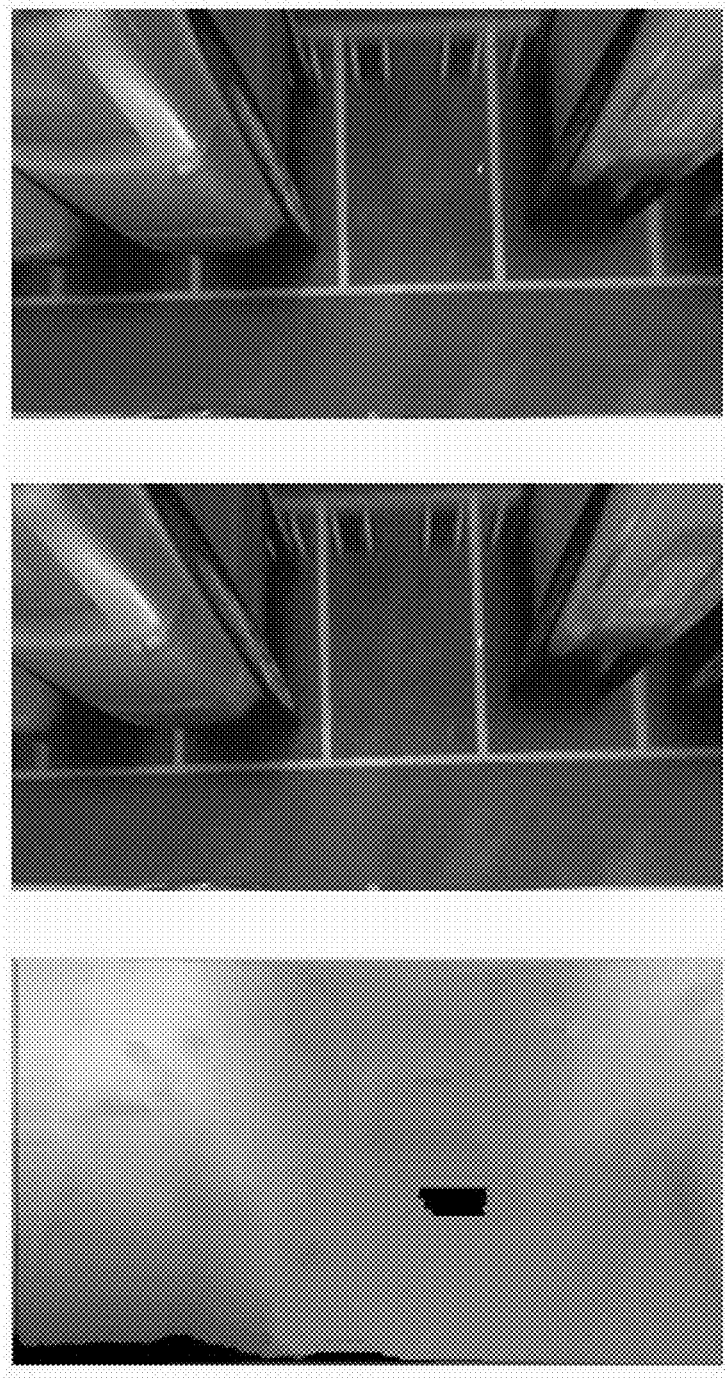
Figure 4C:
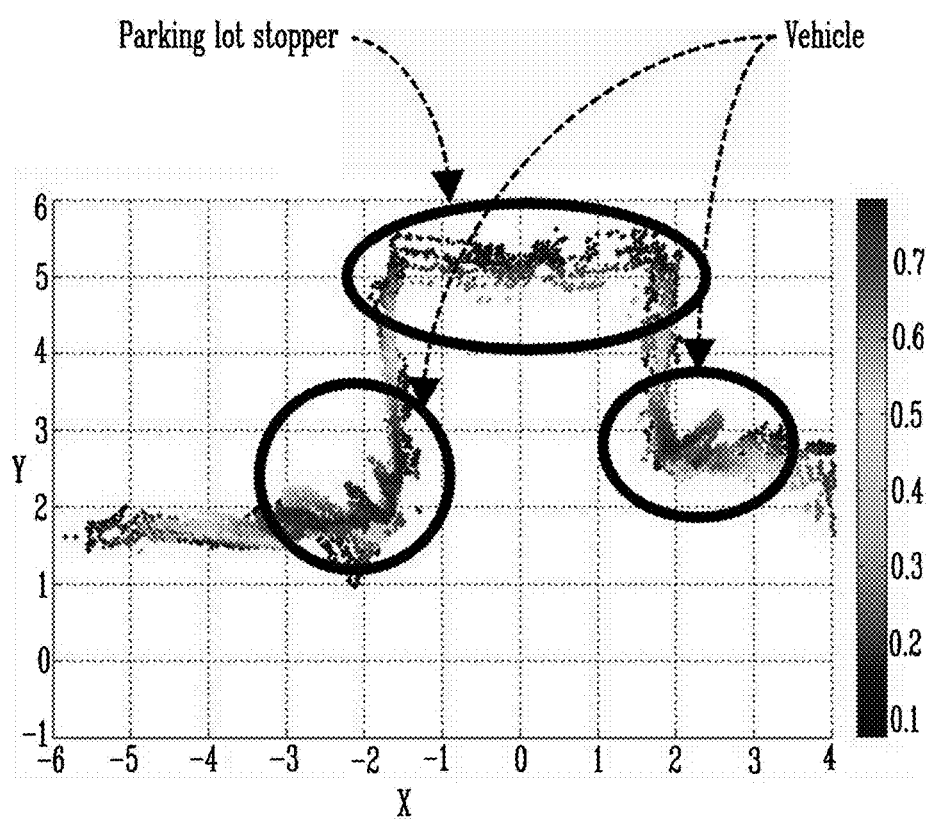

FIGS. 4A, 4B, and 4C are views showing a method of detecting an obstacle according to the embodiment of the present disclosure.

Particularly, FIG. 4A shows stereo rectification and the disparity map, FIG. 4B shows 3D reconstruction, and FIG. 4C shows grid mapping and obstacle segmentation.

1. Stereo Rectification

When the images are provided at different points of time, stereo rectification needs to be first performed in order to make stereo correspondence. For stereo rectification, the two images at different points of time are aligned so that the epipolar lines of the images are in parallel. The image, which is subjected to stereo rectification, may provide correspondence along a parallel axis, and the 3D coordinate may be calculated even using few calculation.

When the vehicle is moved, the image $I_1$ at the current time and the image $I_1$ at the prior time are first obtained. The vehicle motion to $I_1$ and rotation of the vehicle, which are based on $I_1$, are defined by $t \in \mathbb{R}^{3\times 1}$, $R \in \mathbb{R}^{3\times 3}$ respectively.

The correspondence point, which is $x_1^t \leftrightarrow x_2^t \in \mathbb{R}^{3\times 1}$, is obtained during a first step. The correspondence points of the two images are present on the epipolar line, and the epipolar line of $I_1$ is defined by the following equation.

$$I_2 = F\, x_1 \tag{10}$$

F is a fundamental matrix and defined by the following equation.

$$F = K_2^{-T}[f]_x R\, K_1^{-1} \tag{11}$$

$K_1, K_2 \in \mathbb{R}^{3 \times 3}$ are camera matrices of $I_1$ and $I_2$ (see the camera parameters of the inverse perspective image). $R \in \mathbb{R}^{3 \times 3}$ is a rotation matrix, $\hat{t} \in \mathbb{R}^{3 \times 1}$ is a normalized vector of a motion vector t, and $[\bullet]_x$ is a skew symmetry matrix. The vehicle motion is a planar motion, and may be represented by the following equation.

$$[f]_x = \begin{bmatrix} 0 & 0 & \hat{t}_y \\ 0 & 0 & -\hat{t}_x \\ -\hat{t}_y & \hat{t}_x & 0 \end{bmatrix},\ R_z(\theta) = \begin{bmatrix} \cos\theta & -\sin\theta & 0 \\ \sin\theta & \cos\theta & 0 \\ 0 & 0 & 1 \end{bmatrix} \tag{12}$$

t,R are inverse functions of the ego-motion. The coarse fundamental matrix and the coarse epipolar line may be obtained using t,R obtained using the ego-motion. The precise result is obtained using the values of the coarse fundamental matrix and the coarse epipolar line as initial values according to the optimization technique.

First, the correspondence point is found among the feature points that the Sampson distance is present in a predetermined range along the epipolar line of equation 10. The Sampson distance is defined by the following equation.

$$SD = \frac{(x_2^T F x_1)^2}{\|[e_3] \times F x_1\|^2 + \|x_2^T F [e_3]_\times\|^2} \tag{13}$$

$e_3 = [0\ 0\ 1]^T$. The fundamental matrix of stereo rectified pairs has the following very special equation.

$$F = K_2^{-1} R_2^T [e_1]_x R_1 K_1^{-1} \tag{14}$$

$e_1 = [1\ 0\ 0]^T$, $K_1, K_2$ are camera matrices of the images, $K_1 = K_2$. The rotation matrices $R_1, R_2$ are caused by rotation of only a z axis, and accordingly, the fundamental matrix is a function of only $\theta_1$, $\theta_2 \in \mathbb{R}$. When the number of correspondence points is N, $\theta_1, \theta_2$ when the error of the Sampson distance of the following equation 15 is minimized are obtained using the optimization technique in order to obtain the optimized fundamental matrix.

$$\arg\min_{\theta_1,\theta_2 \in \mathbb{R}} \left( \frac{1}{N} \sum_{i=1}^{N} SD(\theta_1, \theta_2, x_1^i, x_2^i) \right) \tag{15}$$

The finally rectified collineation $H_1, H_2 \in \mathbb{R}^{3 \times 3}$ and the rectified images $I_1, I_2$ may be represented by the following equations.

$$H_1 = \tilde{K}_1 R_1 K_1^{-1}$$

$$H_2 = \tilde{K}_2 R_2 K_2^{-1}$$

$$\tilde{I}_1 = \mathcal{F}_{imgp}(H_1, I_1)$$

$$\tilde{I}_1 = \mathcal{F}_{imgp}(H_1, I_1) \tag{16}$$

The equation $\tilde{K}_1 = \tilde{K}_2 \in \mathbb{R}^{3 \times 3}$ is a newly determined camera matrix. In the present disclosure, for the purpose of coincidence with the origin image, the following definitions are given: $\tilde{f}_1 = f_1$, $\tilde{p}_{c1} = [\tilde{c}_{x1}\ \tilde{c}_{y1}\ 1]^T$, $p_{c1} = [c_{x1}\ c_{y1}\ 1]^T$, and $\tilde{p}_{c1} = \tilde{p}_{c2} = R_1(p_{c1} - \tilde{p}_{c1}) + \tilde{p}_{c1}$ when $p_{c1} = [\tilde{c}_{x1}\ \tilde{c}_{y1}\ 1]^T$ with regard to the center point of the image $\tilde{I}_1$. $\mathcal{F}_{imgp}(\bullet)$ is an interpolation function.

2. Dense Reconstruction and Grid Mapping

Various methods are known to obtain dense reconstruction using the rectified image pairs $(\tilde{I}_1, \tilde{I}_2)$.

The 3D coordinate obtained using the aforementioned methods is the coordinate of the virtual camera frame $\{C'\}$. The present disclosure provides a method of transforming 3D point clouds on the frame $\{C'\}$ into the frame $\{P\}$ corresponding to the road surface and of reducing the dimension to perform mapping on the 2D grid map in order to effectively detect the object on the road surface. Since obtained grid map information includes the heights of the objects on the road surface in a 2.5 dimension, the objects may be easily classified according to the height.

When the disparity map is obtained, the 3D coordinate $\tilde{p} = [\tilde{p}_x\ \tilde{p}_y\ \tilde{p}_z]^T$ based on the image $\tilde{I}_1$ is calculated using the following equations.

$$\tilde{p}_x = (\tilde{u} - \tilde{c}_x)\tilde{Z}/\tilde{f}$$

$$\tilde{p}_y = (\tilde{v} - \tilde{c}_y)\tilde{Z}/\tilde{f}$$

$$\tilde{p}_z = b\,\tilde{f}/d \tag{17}$$

$\tilde{c}_x, \tilde{c}_y,$ and $\tilde{f}$ are camera parameters of the rectified image $\tilde{I}_1$, $\tilde{u}$ and $\tilde{v}$ are image coordinates, d is the disparity, and b is the distance between the two images, that is, the vehicle motion distance, and is obtained as the norm of equation 1 while the two images $I_1, I_2$ are obtained.

$\tilde{p}$, which is the obtained 3D coordinate, is the $\{C'\}$ coordinate, and is transformed into the coordinate $\tilde{p}$ of the projective plane $\{P\}$, $\{C'\}$ is transformed into $\{C\}$, and then $\tilde{p}$ is transformed into $\{P\}$, and $\tilde{p}$ is defined by the following equation.

$$p = T_{C'}^{P} R_z(-\theta_1) \tilde{p} \tag{18}$$

$T_{C'}^{P} = [R_x(\pi)| p_{C'}^{P}]$, and $p_{C'}^{P}$ is a vector ranging from the optical center point of the camera to the optical center point on $\{P\}$, and is calculated using equation 8. When the aforementioned equations are solved using substitution of the aforementioned matters, finally, $p = [p_x\ p_y\ p_z]^T$ is represented by the following very simple equation.

$$p_x = \tilde{p}_x \cos\theta_1 + \tilde{p}_y \sin\theta_1$$

$$p_y = \tilde{p}_x \sin\theta_1 - \tilde{p}_y \cos\theta_1$$

$$p_z = \tilde{Z} - \tilde{p}_z \tag{19}$$

When the cell size of the grid map is defined by $\delta\hat{x}$, the coordinate and the value of the cell, which are required in mapping of the grid map, are $(\lfloor v_x/\delta\hat{x} \rfloor, \lfloor v_y/\delta\hat{x} \rfloor)$ and max $(\lfloor v_z/\delta\hat{x} \rfloor)$. Only the values for a predetermined height or more are calculated in order to increase the calculation efficiency. If $p_z$ of equation 19 is substituted by equations 8 and 17, it can be easily seen that $p_z = 0$ when $d = b/\delta\hat{x}$. Therefore, equations 17 and 19 are used for only the region that $d = b/\delta\hat{x} + \alpha$ or more. Further, if $\delta\hat{x} = \delta x$, grid map information is totally identical with $\tilde{I}_1$.

3. Obstacle Segmentation

In the present disclosure, the obstacles are classified into the obstacle, such as a stopper and a curb, which is smaller than the bottom of the vehicle and over which a portion of the vehicle is positioned, and the obstacle which is taller than the bottom of the vehicle and over which the vehicle is not positioned.

The 3D coordinate around the vehicle is transformed into the grid map so as to be expressed as the height from the road surface. Thereby, the obstacle on the road surface is very easily detected according to the height. The object is classified according to the value depending on the height, and the adjacent points are connected to perform labeling. In addition, the contour of each label is subjected to line segmentation to perform modeling using polygons.

Hereinafter, a method of detecting a parking slot marking line will be described. The line marking detection unit 170 may detect the parking slot marking around the vehicle using the following method.

Figure 5A:
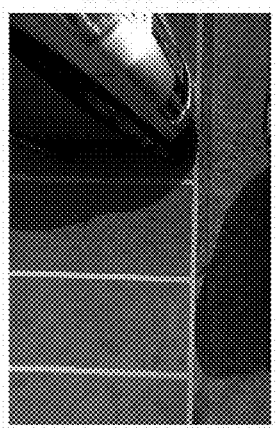
FIGS. 5A, 5B, and 5C are views showing a method of detecting a parking slot marking according to the embodiment of the present disclosure.
Figure 5B:
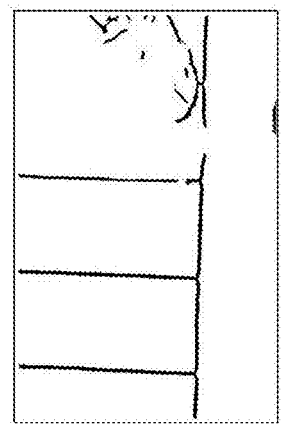
Figure 5C:
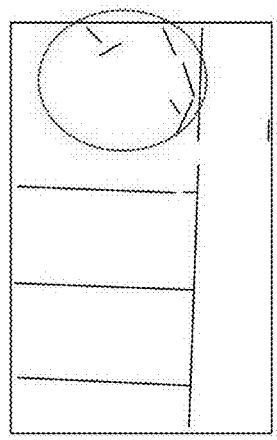

FIGS. 5A, 5B, and 5C are views showing the method of detecting the parking slot marking according to the embodiment of the present disclosure.

Particularly, FIG. 5A shows the input image, FIG. 5B shows line marking detection, and FIG. 5C shows straight-line fitting. Noise may be generated from the parked vehicle (see the red circle).

Typically, the parking slot marking is drawn in a form of straight lines having a predetermined width, such as traffic lines, on the road surface. FIGS. 5A, 5B, and 5C show detection of the parking slot marking line using the inverse perspective image (IPI). The parking line may be detected using a traffic lane detection method (see FIG. 5B).

Next, detected traffic lane information is subjected to modeling into straight lines using a straight-line fitting method (see FIG. 5C).

Since various examples of a technology of finding traffic lanes on a road surface and a straight-line technology are well known, a detailed description will be omitted in the present disclosure. It is noted that, as shown in the red circle of FIG. 5C, the detected line is hidden by the parked vehicle or noise is detected in addition to the traffic lanes. A method of solving the aforementioned problems will be described in detail.

A method of generating the line marking map using information, which is transferred from the obstacle detection unit 160 and the line marking detection unit 170, will be described below. The map building unit 180 may generate the line marking map using the following method.

Figure 6:
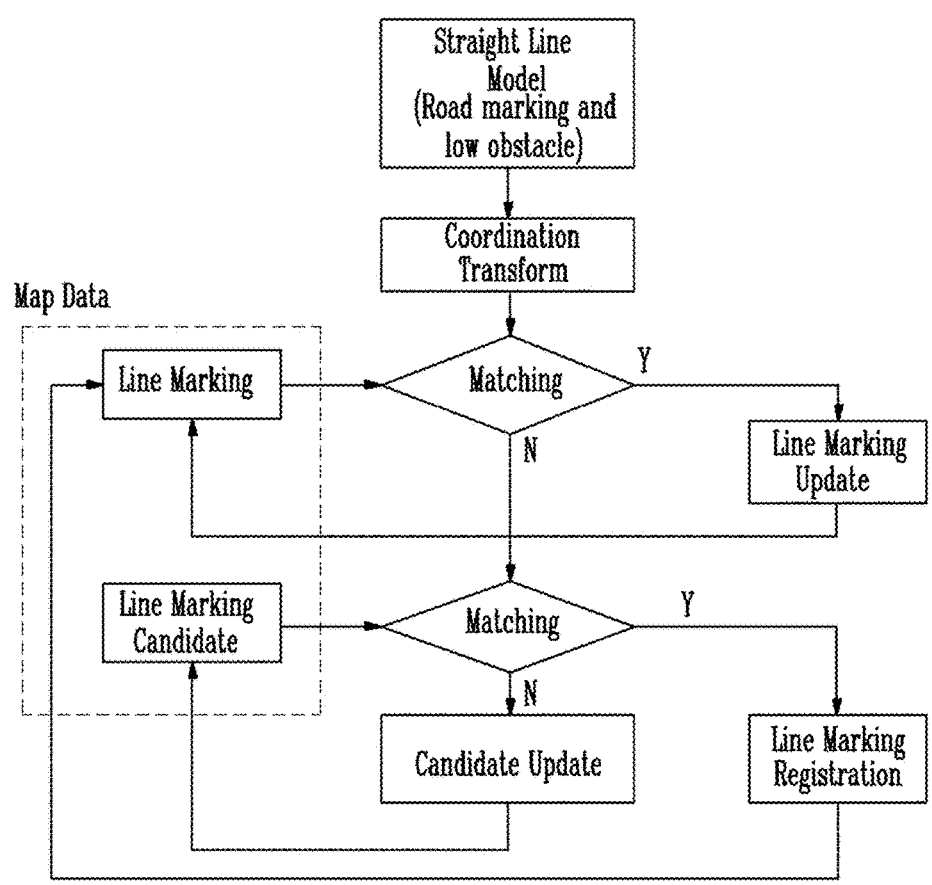
FIG. 6 is a view showing a method of building and managing a line marking map according to the embodiment of the present disclosure.
Figure 7:
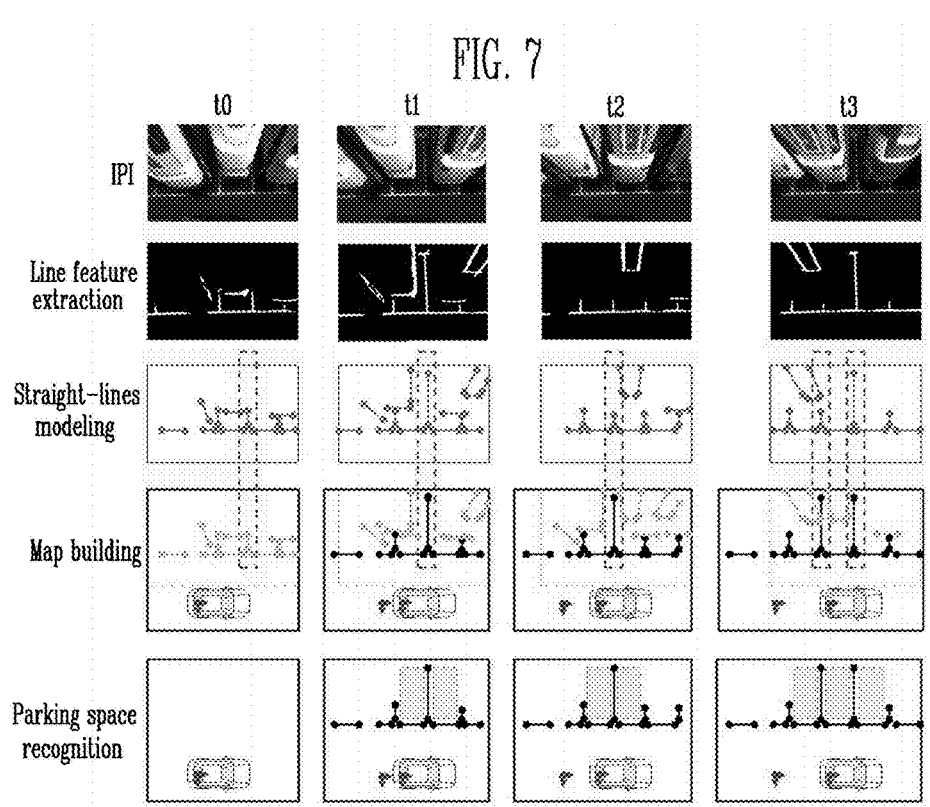
FIG. 7 is a view showing a method of building a line marking map according to the embodiment of the present disclosure.

FIG. 6 is a view showing the method of generating and managing the line marking map according to the embodiment of the present disclosure, and FIG. 7 is a view showing the method of generating the line marking map according to the embodiment of the present disclosure.

Particularly, FIG. 7 shows examples of map building and noise removal. Further, the sky-blue lines are candidate data, the orange-colored lines are noise to be removed, and the black lines are confirmed map data. The lines to be detected and maintained may be seen in the vehicle (see the red dotted-line box).

The obtained line marking includes noise due to other vehicles, curbs, and street trees in addition to the lines on the road surface. The present disclosure provides a method of removing noise and confirming and maintaining the physical position of the line on the road surface.

In the rectified image, perspective distortion does not occur when the object on the projective plane is moved in parallel with the projective plane. That is, in the inverse perspective image using the road surface as the projective plane, the traffic lanes are the same regardless of the vehicle motion, but the type of noise present in locations other than the road surface is changed.

The method of building and managing the line marking map using the aforementioned feature is shown in FIG. 6. The straight-line model of traffic lanes using the image coordinate and the frame $\{I_P\}$ is transformed into $\{O\}$ based on the origin point to secure the same coordinate regardless of time.

Information of the obstacle having the small height is included. Thereby, the parking space, which is present nearby a curb, a flowerbed, or a pedestrian area, may be found. Next, the parking space data are compared to known traffic lane data, and when the identical straight lines are present, information is renewed, and when the identical straight lines are not present, the parking space data are compared to the candidate data. When any straight line of the candidate data is identical with the straight line of the parking space data, the candidate data are transferred to management data, and when the candidate data do not have the straight line which is identical with that of the parking space data, new candidate data are added. The non-matching data of the candidate data when the vehicle is moved by a predetermined distance (e.g. 1 m) or more are deleted.

The traffic lane model of the image coordinate system is transformed into the origin point coordinate system using the following equation.

$$x_O = T_O^V T_V^I x_I \quad (20)$$

$x_O$, $x_I \in \mathbb{R}^{3 \times 1}$ are homogeneous vectors of end points of straight lines based on the frame $\{O\}$ and the frame $\{I_P\}$. $T_O^V$ is the relative position of the vehicle and obtained using equation 1. $T_V^I$ is transformation ranging from $\{V\}$ to $\{I_P\}$ and determined using equation 4.

It is determined whether the detected line, which is subjected to transformation into the frame $\{O\}$, is identical with the line on the map or not, using the following equation. The straight lines between the vehicles may be hidden, and accordingly, when at least one of the two points of the line segment is identical with that of another line segment and the slopes of the two line segments are similar, the lines are determined to be identical.

$$D(L_m, L_s) = \begin{cases} \text{false,} & \text{if } \min_{i,k \in [0,1]} \|L_m^i - L_s^k\|_2 > \tau_x \\ \text{false,} & \text{if } \|\angle L_m - \angle L_s\| > \tau_\theta \\ \text{true,} & \text{otherwise} \end{cases} \quad (21)$$

$L_m$ and $L_s$ are vectors of the straight lines of the map and the scene, which have the vector of both end points of the straight line as the column vector. $L^i$, $L^k$ are i-th and k-th column vectors of the straight line vector, and the vector index is i, k∈[0,1]. $\angle L_m$ and $\angle L_s$ are the slopes of the straight line vectors.

When the matching lines are found, the straight line vector of the renewed map data are defined by the following equation. The end point, which is present within a predetermined distance, is determined using a weighted mean, and when the end point is not present within a predetermined distance, the longer straight line is selected.

$$L_m^i = \frac{L_s^k + w L_m^i}{1 + w}, \{i, k \mid \|L_m^i - L_s^k\|_2 \leq \tau_x\}$$

$$L_m^{i^c} = L_s^{k^c}, \text{ if } d(L_m) < d(L_s) \quad (22)$$

W is a weight and defined by the matching number. $i^c$ and $k^c$ are complementary sets of t and k. d(•) is the length of the straight line and defined by the equation $d(L) = \|L^0 - L^1\|_2$. FIG. 7 shows an example of the process of building the line marking map.

Hereinafter, a method of recognizing a parking space using the aforementioned map data will be described. The parking space recognition unit 190 may recognize the parking space around the vehicle using the following method.

Figure 8:
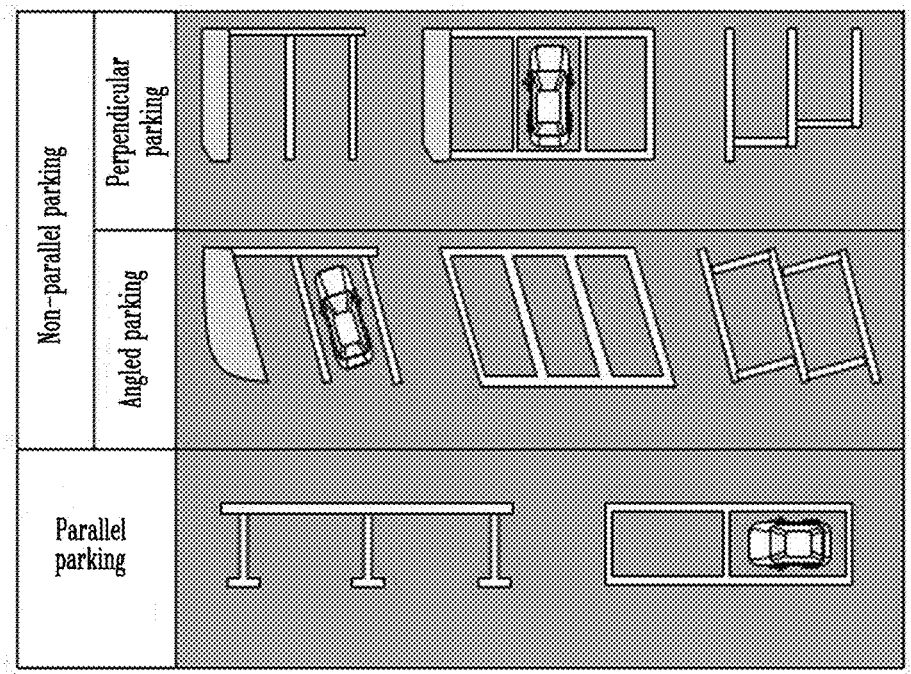
FIG. 8 is a view showing various examples of parking spaces.

FIG. 8 is a view showing various examples of parking spaces. The parking space may be roughly classified into two types (parallel and non-parallel types). In a known method, the space, which is adjacent to a green area (a flowerbed, a sidewalk, and a wall), is not detected.

Figures 9A, 9B:
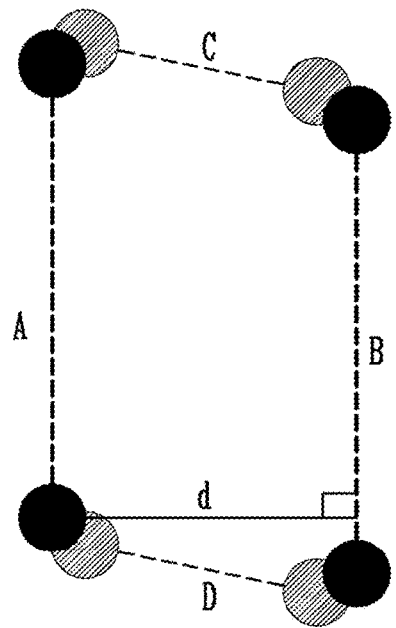
FIG. 9A is a view showing a concept of a generalized parking slot.
FIG. 9B is a view showing a width of the parking slot.
Figure 10A:
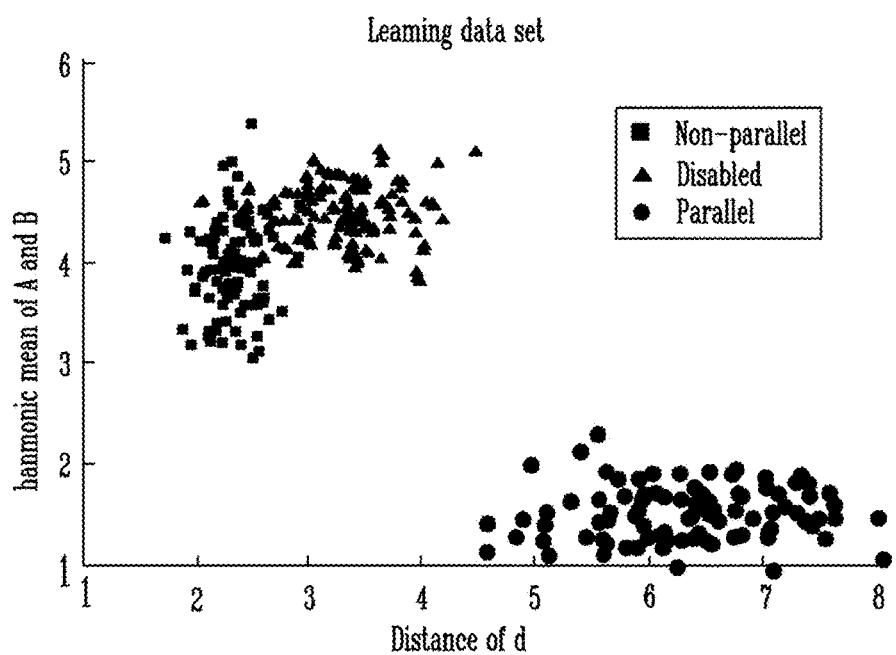

FIG. 9A is a view showing a concept of a generalized parking slot, FIG. 9B is a view showing the width of the parking slot, and FIGS. 10A and 10B are views showing the method of recognizing the parking space according to the embodiment of the present disclosure. Particularly, FIG. 10A is a view showing a learning data set, and FIG. 10B is a view showing a decision function.

First, the parking slot to be recognized will be defined, and a method of recognizing a parking slot using a Bayesian classifier will be described.

FIG. 8 shows various examples of the parking spaces. The parking space may be classified into right-angled parking, diagonal line parking, and parallel parking spaces according to a parking type. However, since right-angled parking may be considered to be a special case of diagonal line parking, parking may be classified into parallel parking and non-parallel parking.

Known research enumerates many types of parking slots according to the shape of parking slot. However, in order to determine a parking maneuver, it is enough to classify parking into only parallel parking and non-parallel parking, and in point of law, the parking slot needs to be classified into a parking slot for the disabled and an ordinary parking slot.

Accordingly, in the present disclosure, parking is classified into three types of non-parallel ordinary parking, non-parallel disabled parking, and parallel parking.

The aforementioned classification depends on the parking type and the regulation, and is a minimum classification including all of information required to determine the parking maneuver in practice.

FIG. 9A shows generalization of one parking slot. Each parking slot may be a set of lines which are spaced apart from each other at regular intervals and are parallel to each other. That is, one parking slot consists of line segments A and B in parallel, and C and D in parallel, and the line segments C and D may not be present. The line segments A and B should be positively provided but may not consist of lines as in the green area of FIG. 10.

For this, boundary information of the low obstacle is added to obstacle information obtained using the obstacle detection unit 160 and used together with road marking information. The present disclosure provides a method of recognizing a parking slot using a Bayesian classifier from line information or boundary information of the obstacle on the road surface based on the aforementioned feature of the parking slot.

The Bayesian classifier used in the present disclosure is defined by the following classifier using a maximum a posteriori (MAP) process.

$$\mathcal{D}_{MAP} = \underset{z_n \in \mathcal{A}}{\mathrm{argmax}}\ P(x \mid z) P(z_n) > \tau \tag{23}$$

$x \in \mathbb{R}^{3 \times 1}$ is an observation vector and $x = [x_L\ x_d]$. $x_L$ is a harmonic mean of line segments A and B and defined by the equation $x_L = 2AB/(A+B)$. $x_d$ is a distance between line segments A and B.

$z_n \in \mathcal{A}$ is a classification set and $\mathcal{A} = [z_{ordinary},\ z_{disabled},\ z_{parallel}]$. $P(x \mid z_n)$ is a likelihood and a probability that an observed value is $x_L, x_d$ when the corresponding class is $z_n$. $P(z_n)$ is a prior probability of the class $z_n$. The likelihood and the prior need to be obtained in order to solve the aforementioned MAP problems. Next, FIG. 10 shows that observed values of one hundred different samples are marked for each class. It can be seen that the feature space shown in FIG. 10 is easily classified. Assuming that the probability density function (PDF) is the multivariate Gaussian function in order to obtain the likelihood $p(x \mid zz_n)$, the observation vector has a 2-dimension, and accordingly, the following relationship is valid.

$$P(x \mid z_n) = P(x \mid \mu, \Sigma) = \frac{1}{2\pi \sqrt{|\Sigma|}} e^{-\frac{1}{2}(x-\mu)^T \Sigma^{-1}(x-\mu)} \tag{24}$$

The equation $\mu = \mathbb{E}[x] \in \mathbb{R}^{3 \times 1}$ is a mean vector, and the equation $\Sigma = \mathrm{cov}[x] \in \mathbb{R}^{2 \times 2}$ is a covariance matrix. In order to reduce numerical errors, equation 23 is substituted by equation 24, the logarithm is made, and the constant is removed to obtain the final decision function represented by the following equation.

$$\hat{\mathcal{D}}_{MAP} = \underset{z_n \in \mathcal{A}}{\mathrm{argmax}}\ \ln\{P(x \mid z) P(z_n)\}$$

$$\cong \underset{z_n \in \mathcal{A}}{\mathrm{argmax}} \left\{ -\frac{1}{2}(x-\mu)^T \sum\nolimits^{-1}(x-\mu) + \left(\ln P(z_n) - \frac{1}{2}\ln|\Sigma|\right) \right\} \tag{25}$$

$\mu$ and $\Sigma$ may be easily obtained from learned data. However, the prior p(z) of the class z is actually impossible to be obtained because there are many types of parking spaces. However, in the case of the most parking spaces, since the parking slots having the same type are consecutively disposed, inference is feasible. Assuming that the initial values are normalized vectors having the same probability, when recognition is performed using equation 25, the corresponding probability p(z) is increased by a predetermined value (e.g. 0.1) and then normalized. The normalized probability is not increased any more when being a specific value (e.g. 0.5) or more.

It is confirmed whether the tall obstacle, over which a portion of the vehicle is not disposed, is present or not in the finally recognized parking slot. If the tall obstacle is not present, the parking slot is determined to have a parking space in which the vehicle is capable of being parked.

Figure 11:
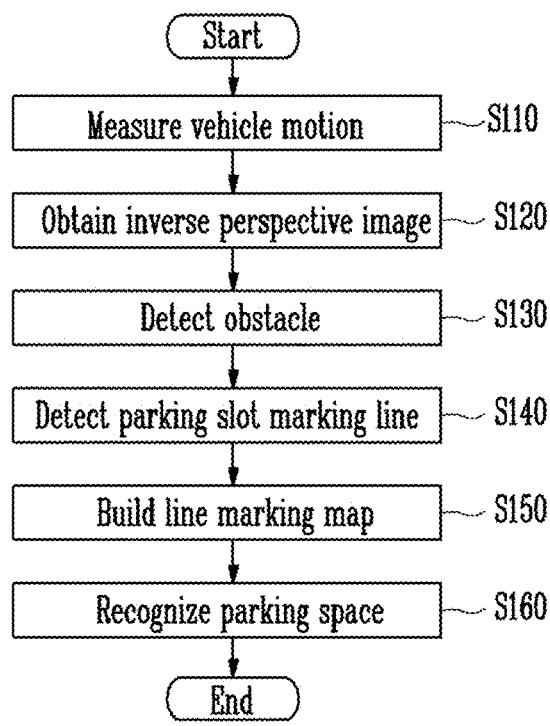
FIG. 11 is a flowchart showing a method of recognizing an obstacle and a parking slot to support an unmanned autonomous parking function according to the embodiment of the present disclosure.

FIG. 11 is a flowchart showing the method of recognizing the obstacle and the parking slot to support the unmanned autonomous parking function according to the embodiment of the present disclosure.

Referring to FIG. 11, a method of recognizing an obstacle and a parking slot to support an unmanned autonomous parking function according to the embodiment of the present disclosure may include measuring a vehicle motion at S110, obtaining an inverse perspective image at S120, detecting the obstacle at S130, detecting a parking slot marking line at S140, building a line marking map at S150, and recognizing a parking space at S160.

The vehicle motion may be measured using the in-vehicle sensor 110 during the measuring of the vehicle motion at S110.

The measuring of the vehicle motion at S110 may be performed using the aforementioned in-vehicle sensor 110 and motion measurement unit 130.

The image, which is obtained using the wide-angle camera 120, may be subjected to inverse perspective transformation to obtain the inverse perspective image (IPI) during the obtaining of the inverse perspective image at S120.

The obtaining of the inverse perspective image at S120 may be performed using the aforementioned wide-angle camera 120 and inverse perspective transform unit 140.

FIG. 11 shows that the measuring of the vehicle motion at S110 is performed prior to the obtaining of the inverse perspective image at S120, but the order of steps may be changed, and both steps S110 and S120 may be performed simultaneously.

The obstacle may be detected using the inverse perspective image (IPI) during the detecting of the obstacle at S130.

The detecting of the obstacle at S130 may be performed using the aforementioned obstacle detection unit 160.

Further, as described above, the detecting of the obstacle at S130 may include obtaining the image before and after the vehicle motion and performing stereo rectification of the image using a SFM (structure from motion) technology, performing dense reconstruction from the rectified image, and projecting the image, which is subjected to the dense reconstruction, on a grid map and segmenting the image according to a height to detect the obstacle.

The parking slot marking line may be detected using the inverse perspective image (IPI) during the detecting of the parking slot marking line at S140.

The detecting of the parking slot marking line at S140 may be performed using the aforementioned line marking detection unit 170.

The line marking map may be built using obstacle information and parking slot marking line information, which are detected during the prior steps, during the building of the line marking map at S150.

The building of the line marking map at S150 may be performed using the aforementioned map building unit 180.

The parking space may be recognized using the line marking map, which is built during the prior step, during the recognizing of the parking space at S160.

The recognizing of the parking space at S160 may be performed using the aforementioned parking space recognition unit 190.

The most known research, which relates to recognition of a parking space, focuses on a process of finding a space and a process of recognizing a parking slot, and is provided for the purpose of application to a parking assistance system (PAS) or an automatic parking system (APS), which is operated by a driver boarding on the vehicle, and accordingly, there is a limit in application to unmanned vehicles.

On the other hand, it is an object of the present disclosure to support an autonomous parking function of an unmanned vehicle, and accordingly, the present disclosure provides a method of recognizing a parking slot, detecting an obstacle, and classifying and recognizing types of parking slots so that a parking type of the vehicle is decided. Moreover, the present disclosure may provide a method of recognizing an obstacle around vehicles, a parking slot, and a type of parking slot using only a vehicle sensor and an image sensor, which are basically provided in known vehicles.

Important characteristics of the present disclosure are as follows.

First, the present disclosure provides a method of generating and analyzing an inverse perspective image of a reference coordinate of vehicles to thus directly obtain dense stereo from the inverse perspective image, and accordingly, the obstacle on the road surface may be detected without any transformation.

Further, the present disclosure provides a method of removing noise from traffic lane information, which is detected from the inverse perspective image, and reconstructing information on traffic lanes hidden by vehicles, and also provides a method of recognizing a parking slot using the aforementioned informations based on a probabilistic recognition technique. Particularly, information on low obstacles is added to traffic lane information to recognize a parking space having no traffic lanes around a curb, a flowerbed, and a pedestrian area, which is not recognized in the related art.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A device for recognizing an obstacle and a parking slot to support an unmanned autonomous parking function, the device comprising:
a processor, and
a non-transitory medium having program instructions stored thereon, execution of which causes the processor to provide functions of
a motion measurement unit configured to measure a vehicle motion using an in-vehicle sensor;
an inverse perspective transform unit configured to perform inverse perspective transformation of an image obtained by a camera, and obtain an inverse perspective image; and
an obstacle detection unit configured to detect the obstacle using the inverse perspective image, by
obtaining an image before and after the vehicle motion and performing stereo rectification of the image using a SFM (structure from motion) technology,
performing dense reconstruction from the rectified image, and
projecting the image that is subjected to the dense reconstruction on a two-dimensional grid map, and segmenting the image according to a height and detecting the obstacle, such that
the detected obstacle is used for unmanned autonomous parking, and
motion stereo is directly performed using the inverse perspective image to provide depth information without any coordinate transformation.

2. The device according to claim 1, wherein the execution of the program instructions causes the processor to further provide functions of:
a line marking detection unit configured to detect a parking slot marking line using the inverse perspective image.

3. The device according to claim 2, wherein the execution of the program instructions causes the processor to further provide functions of:
a map building unit configured to build a line marking map using information transferred from the obstacle detection unit and the line marking detection unit.

4. The device according to claim 3, wherein the execution of the program instructions causes the processor to further provide functions of:
a parking space recognition unit configured to recognize a parking space using the line marking map built by the map building unit.

5. The device according to claim 1, wherein the in-vehicle sensor includes at least one of a wheel speed sensor, a yaw rate sensor, and a steering angle sensor.

6. A method of recognizing an obstacle and a parking slot to support an unmanned autonomous parking function, the method comprising:
measuring a vehicle motion using an in-vehicle sensor;
performing inverse perspective transformation of an image obtained by a camera, and obtaining an inverse perspective image;
detecting the obstacle using the inverse perspective image, including
obtaining an image before and after the vehicle motion and performing stereo rectification of the image using a SFM (structure from motion) technology,
performing dense reconstruction from the rectified image, and
projecting the image that is subjected to the dense reconstruction on a two-dimensional grid map, and segmenting the image according to a height and detecting the obstacle; and
detecting a parking slot marking line using the inverse perspective image, such that
the detected obstacle is used for unmanned autonomous parking, and
motion stereo is directly performed using the inverse perspective image to provide depth information without any coordinate transformation.

7. The method according to claim 6, further comprising:
building a line marking map using detected obstacle information and parking slot marking line information.

8. The method according to claim 7, further comprising:
recognizing a parking space using the line marking map.

9. The method according to claim 6, wherein the in-vehicle sensor includes at least one of a wheel speed sensor, a yaw rate sensor, and a steering angle sensor.

* * * * *